United States Patent

[11] 3,562,423

[72] Inventor Gordon J. Murphy
  Glenview, Ill.
[21] Appl. No. 660,835
[22] Filed Aug. 15, 1967
[45] Patented Feb. 9, 1971
[73] Assignee Northwestern University
  Evanston, Ill.
  a corporation of Illinois

[54] PICTORIAL TRACKING AND RECOGNITION SYSTEM WHICH PROVIDES DISPLAY OF TARGET IDENTIFIED BY BRILLIANCE AND SPATIAL CHARACTERISTICS
  25 Claims, 6 Drawing Figs.
[52] U.S. Cl. .................................................... 178/6.8
[51] Int. Cl. ..................................................... H04n 5/14
[50] Field of Search ........................................ 178/6.8, 6
  (IND), 6 (NAV); 250/203 (CTS)

[56] References Cited
UNITED STATES PATENTS
2,774,964 12/1956 Baker et al. ................... 178/6.8X
3,257,505 6/1966 Van Wechel .................. 178/6.8
3,441,667 4/1969 Novacek ....................... 178/6.8

Primary Examiner—Robert L. Griffin
Assistant Examiner—Richard K. Eckert, Jr.
Attorney—Brown, Jackson, Boettcher & Dienner ABSTRACT: Target selector and video level detector means, operable by an attendant, select a target displayed on a monitor by spatial and brightness characteristics. Processor means analyze the selected target characteristics to obtain error signals indicative of the displacement of the target from the central region of the monitor field of view, and servomeans controlled by the error signals lock the camera to the target to effect centered display of the target on the monitor.

PATENTED FEB 9 1971

FIG. 4
TARGET AND TARGET AREA GATING

FIG. 5

INVENTOR.
GORDON J. MURPHY
BY
Brown, Jackson, Boettcher & Dienner
ATTYS:

PICTORIAL TRACKING AND RECOGNITION SYSTEM WHICH PROVIDES DISPLAY OF TARGET IDENTIFIED BY BRILLIANCE AND SPATIAL CHARACTERISTICS

BACKGROUND OF THE INVENTION

1. Field of Invention

The present invention relates to pictorial data-handling systems, and particularly to an image-scanning device which automatically recognizes and tracks a selected moving object.

2. State of the Art

There are existent in the field today numerous applications in which surveillance of a moving object on a suitable display device is useful and desirable. In a number of these applications, a camera tube is employed to scan a given area and the electronic signals provided by the camera are fed to a monitoring device, such as a cathode ray tube, to effect a visual display of such information to the interested party. A system of such type is conventionally referred to as a closed circuit television system. In such arrangements, the motion of the moving object of interest may be followed by having an attendant either directly or indirectly move the camera in such a manner that the object is always within the field of view of the camera. However, it is frequently difficult, if not impossible, for a human being to manipulate the camera to maintain the object within the field of view. In radioactive areas, areas of intense heat, and other similar type environments, for example, the surroundings are so dangerous to human life that the presence of an attendant is frequently not possible.

In yet other applications, it may be difficult to maintain the desired surveillance because of the speed of the moving object or the erratic nature of the object movement. The tracking of the movement of birds or fish in their natural habitat comprises a typical example of an area in which such problems are encountered. A further difficulty in tracking is experienced in applications in which the area of surveillance is crowded by many objects, and it is desired to track only one object in the midst of many.

SUMMARY OF THE INVENTION

In accordance with the present invention, a pictorial sensor, such as an electronic camera, is employed as a viewing device, and associated circuitry converts such information, as viewed by the camera, into electronic signals. The resultant signals are transmitted to a monitoring device, such as a cathode ray tube, and a visual reproduction of the information scanned by the camera is reproduced on the monitor. Selection means on a target selector are made available to an attendant for the purpose of selecting a target or a target area (i.e., a limited portion of the picture field), and identifying the target by its brightness and spatial characteristics. An associated target marker adapter, as enabled, provides an output signal to change the presentation on the monitor from a target area which is outlined by markers to the contour of the target which is also marked in bright outline on the monitor.

Another output signal of the target marker adapter is used to generate error signals in accordance with the indicated magnitude and sense of displacement of the selected target from the center of the field of view of the camera. The resultant error signals are transmitted to actuators which adjust the electronic camera so that the selected target moves to the center of the field of view on the monitor. Thereafter the camera is moved in a tracking movement of the selected target so that the target display on the monitor is maintained at or near the center of the field of view on the monitor as the target moves about in an arbitrary manner.

BRIEF DESCRIPTION OF THE DRAWINGS

The above and other advantages and features of the invention will be apparent to those skilled in the art from the following detailed description taken in conjunction with the accompanying drawings, in which:

FIGS. 2—6, as arranged in adjacent relation with one another, constitute a schematic circuit of the system shown in the block diagram in FIG. 1.

GENERAL DESCRIPTION OF SYSTEM

Figure 1:
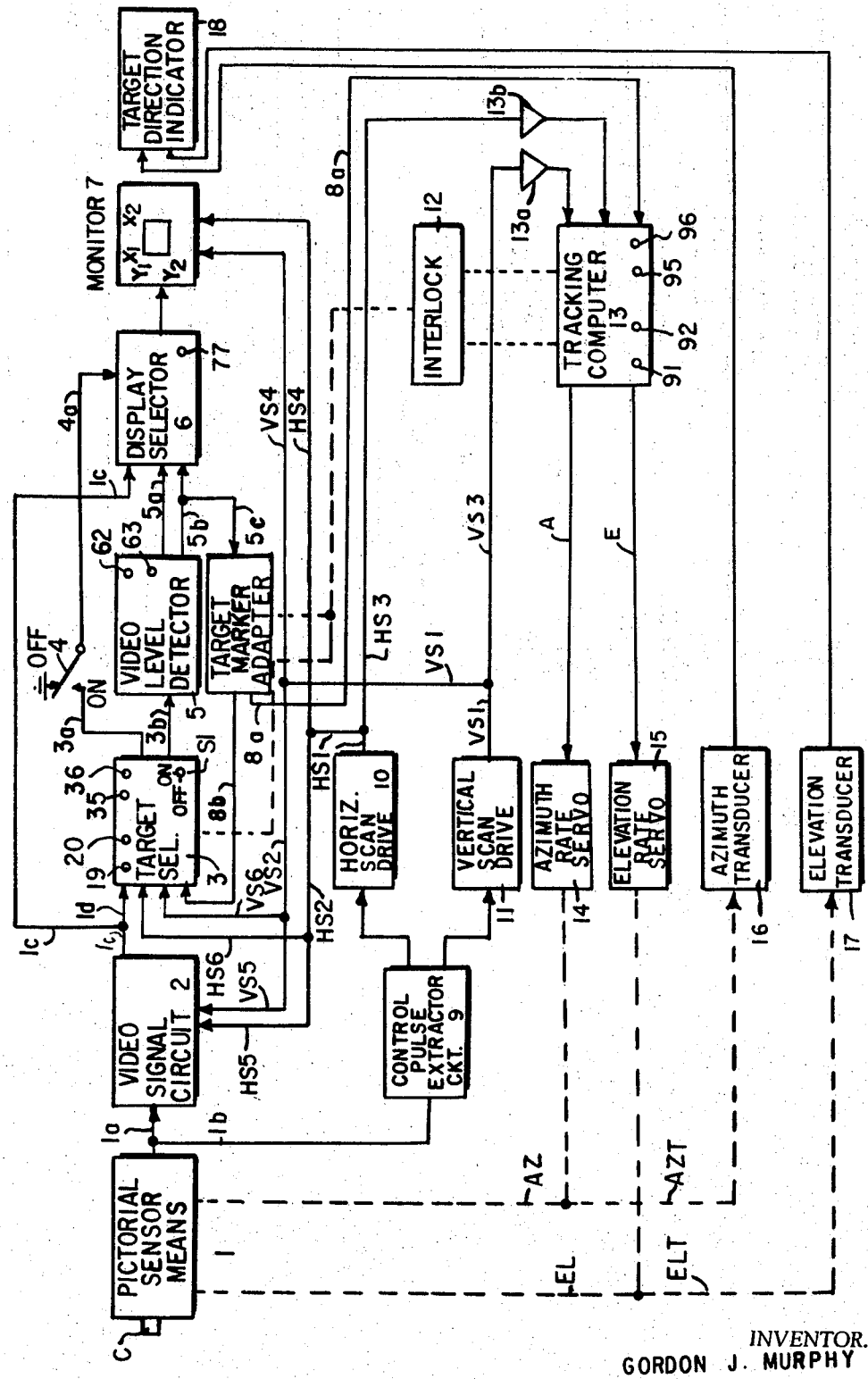
FIG. 1 is a block diagram of the novel pictorial tracking and recognition system.

With reference to FIG. 1, the novel system which achieves automatic tracking of a selected target is shown in block schematic form. As there shown, a pictorial sensor means 1 is provided which may comprise a conventional TV camera, gimbal-mounted in one embodiment to permit 360° rotation in azimuth and 270° displacement in elevation. Actuators for controlling movement of the camera C on such mounting include an azimuth rate servo 14 which effects displacement of the camera in a horizontal tracking motion through suitable mechanical means AZ and an elevation rate servo 15 which effects displacement of the camera C in a vertical tracking motion through suitable mechanical means EL. A tracking computer 13 provides signals over path A to control operation of the azimuth rate servo 14 and over path E to control operation of the elevation rate servo 15. As will be shown, the signals output from the tracking computer 13 are such as to maintain the pictorial sensor means 1 on a target which has been selected by the operator.

Azimuth rate servo 14 alters the azimuth alignment of the electronic camera C in pictorial sensor means 1 at a rate which is approximately proportional to the azimuth error signal provided by the tracking computer 13 and in such a direction as to tend to reduce the error to zero. The elevation rate servo 15 operates in a similar manner to adjust the elevation angle of the electronic camera C at a rate approximately proportional to the elevation error provided by the tracking computer 13, and in a direction which tends to reduce the error to zero.

The mechanical drive means AZ, EL controlled by the azimuth and elevation servos 14, 15 are also connected via mechanical linkage AZT and ELT to position an azimuth transducer 16 and an elevation transducer 17 in a manner to provide an indication to target direction indicator 18 of the elevation and azimuth displacements of the camera element for use by the attendant. Transducers 16, 17 and target direction indicator 18 may comprise conventional synchro repeater pairs or instrument servomechanisms which are well known in the art.

The tracking computer 13 processes the signal output of tracking circuitry TC to provide the signals required to "lock" the camera on a target which is selected by the operator. Interlock means 12 are provided for the tracking computer 13, as will be shown, to permit the operator to actuate the scanning equipment freely when the track switches are in the off position, and further to automatically open the track switches when the scan switches in the tracking computer are turned on. The interlock means 12 also enable the operator to prevent improper operation of the target maker generator in the system as will be more fully set forth hereinafter.

The signal output of the adjustable electronic camera C in pictorial sensor means 1 is assumed to be the video output of a conventional TV camera which is fed over path 1a to a video signal circuit 2 which extracts the picture information by subtracting the control pulses from the total video signal and feeding the resultant picture information signals over path 1c to the display selector 6 and over path 1d to the tracking circuitry TC. The display selector switch 77 in the display selector 6 in one of its positions connects the signal through a mixing amplifier to the video input of the monitor 7 in the manner of a conventional closed TV circuit, whereby the information contained in the video signal provided by the electronic camera 1 is displayed on a raster, the generation of which is controlled by the horizontal and vertical drive pulses which are provided over conductors HS4, VS4 in a manner to be described. In such mode (i.e., display selector switch 77 in the described position) the monitor 7 will display the total field viewed by the electronic camera C. If a conventional TV receiver is used as a monitor in the system as will be apparent, a separate video signal circuit 2 would not be required.

The output of electronic camera C in pictorial sensor means 1 is also connected to the input of the control pulse extractor 9 which serves to extract the control signals required to synchronize the operation of the system circuitry with the presentation of the display on monitor 7. A horizontal scan drive circuit 10 connected to the output of control pulse extractor circuit 9 serves to provide the horizontal drive signals for the system over path HS1, HS4 to the horizontal deflection coils on the monitor 7. Vertical scan drive 11 connected to control pulse extractor circuit 9 comprises well-known circuits for supplying sawtooth signals over path VS1, VS4 to the vertical deflection coil for monitor 7.

As above, if a conventional TV receiver is used for monitor 7, it will not be necessary to include a separate control pulse extractor 9 or separate horizontal and vertical scan drives 10 and 11.

The sawtooth output of the horizontal scan drive 10 and the sawtooth output of the vertical scan drive 11 are also coupled over path HS1, HS2, HS5 and VS1, VS2, VS5 to the video signal circuit 2 for use in providing the picture information signal and over path HS1, HS2, HS6; VS1, VS2, VS6 to the target selector 3 for use as reference signals in selecting different target areas in the total picture display provided by the camera on monitor 7. The sawtooth outputs of the horizontal scan drive 10 and vertical scan drive 11 are also coupled over paths HS1, HS3; VS1, VS3 and amplifiers 13a and 13b to the tracking computer 13 to synchronize the operation of the tracking computer 13 with the display on the monitor 7.

The target selector 3 includes a pair of adjustable knobs 19, 20 for selecting the horizontal coordinates of a target area in the total field or picture on display which includes a target which the attendant desires to have tracked by the system for observation on the monitor 7. A second pair of adjustable knobs 35, 36 are used to select the vertical coordinates of the target area on the monitor 7 in which the desired target appears. With the tracking switch S1 and the marker display switch 4 turned to the "ON" position, signals are transmitted by the target selector 3 over path 3a, 4a to display selector 6 to provide a bright outline of the selected area on the monitor which has coordinates X1, X2 as determined by the settings of knobs 19, 20, and coordinates Y1, Y2 as determined by the setting of knobs 35, 36.

Target selector 3 transmits video signals over path 3b to the video level detector 5 during the period the selected target area determined by X1, X2, Y1, Y2 is being traced on the monitor 7.

The video level detector 5 operates to provide a voltage corresponding to the maximum brightness and minimum brightness respectively for the selected target regarded by the operator as being of interest, such settings being achieved by means of knobs 62, 63 on video level detector 5. Thus as will be shown, if the video level detector 5 is set to track a certain target, and a much brighter object enters the field, the maximum brightness level set into the system will be exceeded, and the equipment will automatically reject the video signal for the wrong target within the target area. The system is operative in a similar manner to recognize a signal below the minimum brightness level as representing a target other than the one selected and to reject such a signal.

One output of the video level detector 5 is fed over path 5b, 5c to the target marker adapter 8 which provides an output signal over path 8b to an input for target selector 3 indicating the presence or absence of a significant target, i.e., a target with the selected brightness and spatial features. As will be shown, the signals over path 8b serve to modify the shape of the target area outline on the visual display so as to obtain an illuminated contour which conforms to the actual shape of the target with the selected spatial and brightness features. That is, when the selected target has been brought within the target markers on the monitor, and the operator actuates the tracking switch S1 on the target selector 3, the contour of the selected target replaces the rectangular outline of the target area selected. Additionally, the signals output from the target marker adapter over path 8a to the tracking computer 13 will result in locking of the system to such target. The computer 13 thereupon controls the camera C to follow the selected target, and to effect display of the target thereafter at the center of the monitor 7.

In the event that a target with the spatial and brightness features determined by the settings of knobs 19, 20, 35, 36 (spatial) and 62, 63 (brightness) is not present for a length of time which is preset in the target marker adapter 8, the target area outline provided by the target markers takes the form of the rectangle determined by the settings of knobs 19, 20, 35, 36.

The display selector switch 77 has four positions. As noted above, with the display selector switch 77 in one position, the signal output of the video signal circuit 2 on path 1c is fed to the monitor 7 to provide a display of the total picture output from the electronic camera 1 on the screen of the monitor 7 in the manner of the well-known closed circuit TV operating mode. With movement of the display selector switch 77 to a second position, the video signal output of the video level detector 5 on path 5a is coupled to the monitor, whereby the target alone is reproduced on the monitor 7, and with movement of the display selector switch 77 to a third position, the signal output of video level detector 5 on path 5b which comprises a quantized representation of the target is fed to the monitor 7. In the fourth position the target will be presented at maximum brightness within the full field of the camera.

As indicated above, the signal output of the horizontal scan drive 10 and the vertical scan drive 11 are also coupled over paths HS3, VS3, respectively, to the tracking computer 13. In addition, the signal output of the video level detector 5 over path 5b, 5c is fed through the target marker adapter 8 and over path 8a to a further input of the tracking computer 13. The primary function of the tracking computer 13 is to derive from the video signal input over path 8a an appropriate error signal to be applied over the conductors A, E to the azimuth rate servo 14 and the elevation rate servo 15, respectively, for the purpose of positioning the electronic camera C so as to cause the selected target to appear to move to the center of the visual display on the monitor 7 in a manner to be set forth more fully hereinafter.

The azimuth alignment and elevation alignment of the electronic camera are at all times fed to azimuth transducer 16 and elevation transducer 17, respectively, by mechanical linkage AZT, ELT respectively. These transducers in turn operate the target direction indicator 18 so that an accurate picture of the relative position of the electronic camera is continually provided to the attendant. Manual control switches 91, 92; 95, 96 on the tracking computer 13 permit manual adjustment of the camera position by the attendant independent of the tracking control provided by the tracking circuitry.

DETAILED DESCRIPTION a. Video Signal Circuit

Figure 2:
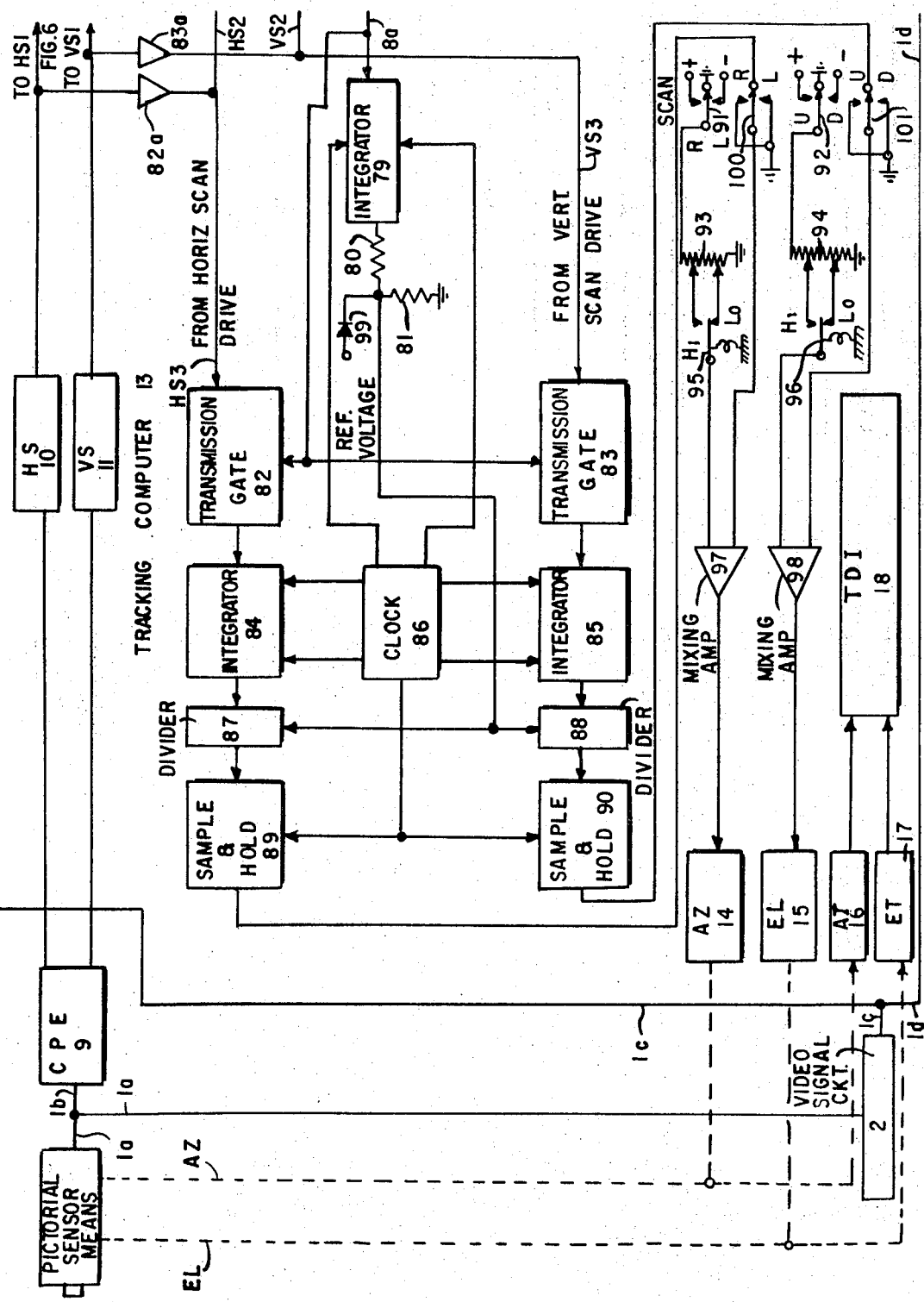

With reference to FIG. 2, the pictorial sensor means 1 including the electronic camera C is shown in its connection to provide a video signal including the control pulses over output paths 1a, 1b to the video signal circuit 2 and the control pulse circuit 9, respectively. In the event the output of the electronic camera is a video signal, as shown, the video signal extractor consists of a well-known video detector, video amplifier and DC restorer. In systems in which the electronic camera 1 is a television camera, and in which the output is in an RF modulated form instead of a video signal as shown in the present embodiment, the video signal circuit 2 comprises well-known circuits including an RF amplifier, a mixer, an IF amplifier, a video detector, a video amplifier and a DC restorer, all of which are well known and are not set forth in detail in the present disclosure. In systems in which the electronic camera 1 is a solid state or molecular camera corresponding operations are performed by well-known timing logic transmission and switching circuits. In each of the described arrangements, the video signal output of the video signal circuit 2 is provided over path 1c, 1d as one input to the target selector 3.

b. Control Pulse Circuit

The control pulse extractor 9 serves to separate from the signal output of the electronic camera 1, the synchronizing signals which are used to synchronize the system operation with the presentation on the monitor or display device 7. In instances in which the output of the television camera is a video signal as shown, the control pulse extractor 9 consists of a well-known video amplifier, video detector, DC restorer, sync separator, sync detector and sync amplifier circuits. In systems wherein the electronic camera 1 is a television camera having an RF modulated form of signal output instead of a video signal as shown in the present embodiment, the control pulse extractor 9 comprises well-known circuits including an RF amplifier, mixer, IF amplifier, video detector, video amplifier, DC restorer, sync separator, sync amplifier and sync detector, some of which may be common to the video signal circuit 2, if desired.

In systems in which the electronic camera 1 is a solid state or molecular camera, the corresponding operations are performed by well known timing logic and switching circuits.

While shown as separate circuits in the present disclosure, if desired, the video signal circuit 2, control pulse extractor 9, horizontal scan drive 10 and vertical scan drive 11 and monitor tube 7 may comprise circuits of a conventional TV receiver, and the illustrated circuitry would be connected in a manner made evident by the separate showing of circuits 2, 9, 10, 11 in FIG. 2.

In either arrangement (i.e., whether the components are part of the conventional television receiver or if the video signal circuit 2, control pulse extractor 9, horizontal scan drive 10 and vertical scan drive 11 are provided as separate circuit arrangements) the output signal from the horizontal scan drive circuit 10 will comprise a sawtooth waveform at the horizontal rate, and the signal output of the vertical scan drive 11 will comprise a sawtooth waveform at the vertical rate, the two sawtooths being effective as applied over conductors HS1, VS1, respectively, to a display tube, such as in the monitor 7, to generate a raster on the display for use in presentation of the video information supplied by the video signals input thereto via the display selector 6.

TARGET SELECTOR CIRCUIT 3 a. Coordinate Selection

Figure 3:
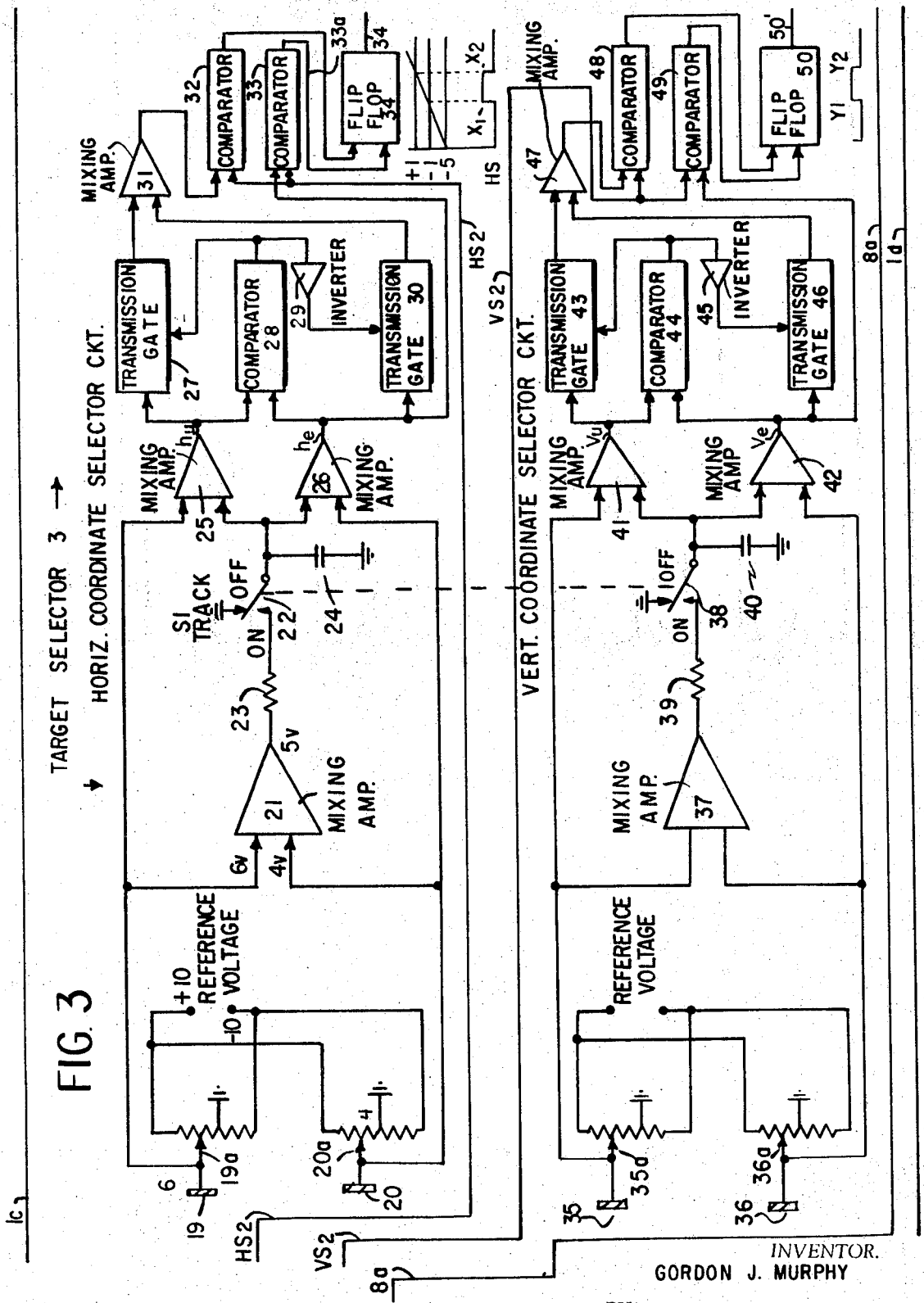

The sawtooth waveform outputs from the horizontal scan drive 10 and the vertical scan drive 11 are also fed over conductors HS2, VS2, respectively, to the target selector 3 (FIG. 3) and the video signal output of the video signal circuit 2 is input to the target selector 3 over path 1c, 1d. As shown in FIG. 3, a first section of target selector 3 is used to select the horizontal coordinates X1, X2 and vertical coordinates Y1, Y2 of the target area to be presented on the monitor 7. More specifically, a first pair of knobs 19, 20 is connected for use by the operator in adjusting the potentiometers 19a, 20a to different values, to thereby select a target area on monitor 7 having horizontal coordinates of correspondingly different values. A second pair of knobs 35, 36 is arranged to adjust potentiometers 35a, 36a, to different values to select a target area having vertical coordinates of correspondingly different values. In this manner, a target area may be selected from any portion of the viewing area on the monitor 7, and as will be shown, such area is selected to include a significant target which is to be monitored.

More specifically, the horizontal coordinates X2, X1 are selected by adjusting potentiometers 19a, 20a to obtain an upper level and a lower level voltage, respectively. In a typical example, the voltages may be selected from a source ranging from +10 volts to −10 volts with ground reference at zero volts. The average value (one-half the sum) of the upper level voltage and the lower level voltage are computed in a mixing amplifier 21 and with contacts 22 on the track switch S1 closed, the output of the mixing amplifier is transmitted through a network including a resistor 23 and a capacitor 24 to inputs on mixing amplifiers 25, 26. The mixing amplifier 25 has a second input connected to the potentiometer 19a, and the mixing amplifier 26 has a second input connected to the potentiometer 20a. The components of the mixing amplifier 25 are connected to subtract the average value of the selected voltage from the upper level voltage determined by the setting of potentiometer 19a to thereby provide a modified upper level voltage $h'_u$. In a similar manner, the average value voltage fed over contacts 22 on track switch S1 to the mixing amplifier 26 is subtracted from the lower level voltage which is determined by the setting of potentiometer 20a to obtain a modified lower level voltage $h_l$.

By way of example, assuming that potentiometer 19 is adjusted to select a desired horizontal coordinate on the monitor and in such setting has an output of 6 volts, and that the second potentiometer 20 in its setting provides an output of 4 volts, the 6 volt signal over one input to the mixing amplifier 21 and the 4 volt input applied to the second input of the mixing amplifier 21 will result in a 5 volt output to one input circuit of the mixing amplifiers 25, 26. The mixing amplifier 25 thus compares the 6 volt input from potentiometer 19a and the 5 volts (average value from the mixing amplifier 21) on the second input, and provides a modified upper level voltage $h_u$ of +1 volt at its output. The mixing amplifier 26 in comparing the average value input of 5 volts on one input from the mixing amplifier 21 and the 4 volt signal on the input from the potentiometer 20a provides a modified lower level voltage output signal of −1 volt.

The modified lower level voltage $h_l$ (−1 volt in the present example) is compared with modified upper level voltage $h_u$ (+1 volt in the present example) in a comparator circuit 28. The comparator 28 may be any known device having one output and two inputs, which provides a logical 1 output when a given one of its two inputs is less than or equal to the other output, and which with other conditions on the inputs provides a logical zero output therefrom. A typical comparator circuit may be found in Digital Equipment Corporation, Logic Handbook, 1967 Edition, P. 349. In the present connections of the comparator 28, if the modified lower level voltage $h_l$ is less than, or equal to, the modified upper level voltage $h_u$ (as in the present example), the output of the comparator 28 is a logical one. If such condition is not satisfied (if the modified lower level voltage is greater than the modified upper level voltage), the output of the comparator 28 is a logical zero.

The output of the comparator 28 is fed to the enabling input of a transmission gate 27, which has a signal input connected to the output of the mixing amplifier 25 which provides the modified upper level signal $h_u$. The output of the comparator 28 is also fed through an inverter 29 to the enabling input of the transmission gate 30 which has a signal input connected to the mixing amplifier 26 which provides the modified lower level signal $h_l$. Transmission gates 27 and 30 may be any known device which transmits the signal at its input circuit when the signal applied to the enabling circuit is a logic 1, but which does not transmit the signal at its input circuit when the enabling signal applied is a logical zero. The inverter 29 may be any known device which provides a logical 1 output whenever the input is a logical zero, and a logical zero output whenever its input is a logical 1.

Thus in the present example wherein $h_u$ is +1 volt and $h_l$ is −1 volt, the output of the comparator 28 is a logical 1, and the transmission gate 27 will be enabled to transmit the +1 volt input signal at its input circuit over its output circuit to one input circuit of a mixing amplifier 31. The second input of the mixing amplifier 31 is connected to the output of the transmission gate 30. Since the signal over the enabling path for the transmission gate 30 is logic 0, the gate will not transmit its input signal to the mixing amplifier 31.

The output of the mixing amplifier 31 is connected as one input to a comparator circuit 32. A second input circuit to comparator circuit 32 is connected to the horizontal scan drive conductor HS2 over which, as noted above, a positive-going sawtooth waveform is received at the horizontal line rate of the raster trace.

A second comparator 33 has a first input connected to the output of the mixing amplifier 26 (which supplies the lower level voltage $h_1$) and a second input connected to the horizontal scan drive conductor HS2. Assuming for purposes of example that the horizontal sawtooth has an initial value of −5 volts and is positive-going to a value of +5 volts, as the sawtooth increases in value during a line trace, and specifically to a value of −1 volt (the value of the modified lower level signal on the second input) comparator 33 provides an output signal over conductor 33a to the set input of the flip-flop 34. As the sawtooth continues to increase in value, and specifically, as the value of the sawtooth is +1 volt (the value of the signal provided on the second input to the comparator 32), the comparator 32 will provide an output signal to the reset input circuit of the flip-flop 34.

With the described signal input, it will be seen that the output of the flip-flop 34 is a rectangular pulse, the leading edge of which is determined by the time of occurrence of the input pulse from the comparator 33 to the set input of the flip-flop 34, and the trailing edge of which is determined by the time of the signal from the comparator 32 over the reset input of the flip-flop 34, the timing of which signals is in turn referenced to the start of each line trace.

Manifestly, shifting of the value of the settings of the potentiometers to provide correspondingly different reference values to the comparators 32, 33 will result in shifting of the time of generation of the rectangular pulse relative to each line trace provided on the monitor 7. In the example given, the values are such that the center of the pulse output from the flip-flop 34 occurs in the center of the horizontal line trace, and the X1, X2 coordinates are determined by the leading and trailing edges of the pulse generated by flip-flop 34. If both the modified upper level and the modified lower level signal were of correspondingly more positive values the X1, X2 coordinates would shift toward the right-hand side of the display, and if the modified upper level and lower level signals were of correspondingly more negative values, the X1, X2 coordinates would shift toward the left-hand side of the display. Changing of the settings on the potentiometers 19a, 20a so that there is a smaller difference therebetween would result in a smaller distance between coordinates X1, X2 (and a correspondingly narrower target area). Increasing the difference in the signal values will increase the width of the target area.

In a similar manner, the vertical coordinate selection circuitry includes a first and a second potentiometer 35 and 36, a mixing amplifier 37, contacts 38 on track switch S1, an RC network including resistor 39, capacitor 40, mixer amplifiers 41, 42, a comparator 44, an inverter 45, transmission gates 43, 46, a mixing amplifier 47, comparators 48, 49 and a flip-flop 50. The connections of such circuits will be obvious from the description of the horizontal coordinate circuitry. The circuitry operates in the manner of the horizontal section to provide modified upper level and lower level signals $v_u$ and $v_1$, respectively, as inputs to the comparators 49, 48 respectively. However, in the vertical circuitry, the second inputs of the comparators 48, 49 are connected to the vertical scan drive conductor VS2 which provides a sawtooth signal at the vertical rate of the raster. Thus, assuming a raster trace from top to bottom and a negative-going vertical sawtooth, the value of the input signal to the comparator 48 will determine the location of the coordinate Y2 (or the trailing edge of the pulse output from the flip-flop 50) and the value of the signal input to the comparator 49 will determine the location of the coordinate Y1 (or the leading edge of the pulse output from the flip-flop 50).

The rectangular gating signal output from the flip-flop 50 will occur for a number of line traces determined by the difference in value of the signals $v_u$ and $v_1$. For convenience the rectangular pulse is shown to occur with the midpoint thereof at the center of the vertical trace on the monitor 7.

Similarly, the duration and time of the rectangular pulse X1, X2 in each line trace determine the width and horizontal position of the target area, and the duration and width of the rectangular pulse Y1, Y2 in each raster determine the height and vertical position of the target area.

TARGET AND TARGET AREA GATING

The horizontal gating signal output from the flip-flop 34 is fed over conductor 34' to one input of an AND gate 51 which, as will be shown, is also controlled by an output signal received over path 8b from the target marker adapter 8 (FIG. 4) only when points of the selected target are being scanned during periods when a target having a brightness in the range selected by the attendant is within the target area selected by the attendant and at all times during periods when no such target is within the selected target area.

The vertical gating signal output from the flip-flop 50 is connected over conductor 50' as one input to an AND circuit 52, the second input of which is connected over path 8b to the output of the target marker adapter circuit 8, which, as described above, will provide an enabling output only when points of the selected target are being scanned during periods when a target having a brightness in the range selected by the attendant is within the target area selected by the attendant and at all times during periods when no such target is within the selected target area. The AND or coincident gates 51, 52 are well known circuits having at least one output and at least two inputs which are characterized by the property of providing an output signal only when signals are present simultaneously at all inputs.

The output signals of the AND gate 51 are fed to a differentiator circuit 53 which may comprise any well known resistance-capacitor circuit (or any other known device) which performs an operation approximating differentiation. As a result of the differentiation, the leading edge and the trailing edge of the gating signal are converted to a positive pulse and a negative pulse, respectively, which are fed through an absolute value unit and limiter 55 to one input of an AND gate 57. The absolute value unit may be any known circuit which provides an output approximately proportional to the absolute magnitude of its input over its range of operation. The associated limiter prevents over-driving of the following AND gates. Examples of such circuits may be found in Analog Methods, Second Edition, Walter J. Karplus and Walter W. Soroka, McGraw-Hill Book Company, Inc., New York, 1959, pp. 75, 76. A second input of the AND gate 57 is fed by the output of the AND gate 52.

In a similar manner, the rectangular pulse which is gated by the AND gate 52 is fed to a differentiator 54, the output of which is transmitted through an absolute value unit and limiter 56 to an AND gate 58. The second input of the AND gate 58 is connected to the output of the AND gate 51.

It will be seen that a signal output from the AND gates 57, 58 occurs only when the electron beam is on the boundary of the selected target area. See the waveforms adjacent to the AND gates 57, 58 (FIG. 5a).

The output signals of the AND gate 57 and the AND gate 58 are added in a mixing circuit 59 and, with the marker display switch 4 closed, the signals are fed to the mixing amplifier 78 (FIG. 6) as an input to the gun on the monitor unit 7. In that the leading edges of the horizontal and vertical gating signals are differentiated, the target area will be outlined by a brightened line. That is, with reference to FIG. 5a, the leading edge X1 of each horizontal pulse provided by the flip-flop 34 as differentiated will result in the brightened vertical line extending from Y1 to Y2 on the left-hand border, and the differentiation of the trailing edge X2 results in the right-hand vertical line which outlines the target area. In a similar manner, differentiation of the leading and trailing edges Y1, Y2 of the vertical pulse output from the flip-flop 50 results in the brightening of the upper and lower boundaries of the target area. In the event the marker display switch 4 is open, it is apparent that the markers for the target area will not be displayed on the monitor 7.

VIDEO GATING FOR TARGET AREA

In addition to providing the brightened outline (or markers) for the selected target area, the target selector circuit 3 (FIG. 4) is also operative to transmit the video signal output of the electronic camera C as provided over conductor 1d by the video signal circuit 2 to the video level detector 5 for the purpose of permitting the operator to establish a brightness range for a desired target. Since such detection is only to occur in the target area, the horizontal gating signal output from the flip-flop 34 and the vertical gating signal output from the flip-flop 50 are coupled as inputs to an AND gate 60 to provide a gating signal output therefrom only during the period of coincidence of the horizontal gating and vertical gating signals (i.e., the period during which the selected target area X1, X2; Y1, Y2 is being traced on the monitor 7).

The output of the AND gate 60 is fed as an enabling signal to the transmission gate 61 which has its signal input connected over conductor 1d to the video output of the video signal circuit 2. It will be apparent therefrom that the video signal output of the electronic camera C will be connected to the video level detector 5 by the transmission gate 61 only during such portion of the raster trace in which the selected target area is being traced.

In the description thus far, it is assumed that the marker generator in the target selector 3 is being used to generate an illuminated rectangle on the monitor 7 so that the operator may conveniently adjust such rectangle to a position on the monitor 7 which contains the selected target. As will be shown hereinafter, if the target marker adapter 8 (FIG. 5) is enabled, the signal input to the AND gates 51, 52 over conductor 8b will be modified so that in lieu of the illuminated rectangle on the visual display, the display will provide an illuminated contour conforming to the actual shape of the target with the selected spatial and brightness features. That is, the signal input over path 8b will control the AND gates 51, 52 to operate only during the period in the target area trace in which signals representing the selected significant target are detected by the target marker adapter 8. Since the leading edge of the pulses output from the AND gates 51, 52 are differentiated it will be apparent that the selected target will be presented with a brightened outline on the display. The manner in which such operation is effected to achieve the presentation of the illuminated contour of the actual target shape with the selected spatial and brightness features is set forth in more detail in the description of the target marker adapter 8.

VIDEO LEVEL DETECTOR 5

The video level detector shown in FIG. 5 includes a first and a second brightness selector knob 62, 63 which are respectively adjustable to select a maximum brightness and minimum brightness for a significant target in the target area which is regarded by the operator as being of interest. Thus, the maximum level knob 62 adjusts a potentiometer 62a to provide a reference signal from a suitable reference source to one input of a comparator 64, which signal indicates the maximum brightness of the target of interest. The minimum level knob 63 operates a second potentiometer 63a to provide a reference signal to a comparator 65 which indicates the minimum level of brightness of the significant target. The second input to the comparators 64, 65 comprises the signal output from the transmission gate 61, which it will be recalled comprises the video signal which is provided by the electronic camera C during the period that the selected target area is being traced.

The comparators 64, 65 will in turn provide output signals to the AND gate 66 which consist only of signals which are within the predetermined range of values selected by the potentiometers 62, 63 and which occur during the target area trace on the monitor.

In operation, if the potentiometers 62, 63 are set to track a target having a brightness in a certain range and a brighter target enters the target area, the maximum level setting 62 will be exceeded and the comparator 64 will have a logic 0 output while the brighter target is being scanned. Similarly if a target having a brightness of less than one value set on the potentiometer 63a enters the target area, the comparator 65 will provide a logic 0 output while the brighter target is being scanned. If the input video signal gated by the transmission gate 61 is in the selected range, both of the comparators 64, 65 will provide a logic 1 output, and the AND gate 66 will provide a logic 1 output (a quantized signal) over conductor 5b to the transmission gate 67 and the display selector 6. Alternatively (i.e., with the receipt of a signal outside the selected brightness range) the output of the AND gate 66 to the transmission gate 67 and the display selector 6 is a logic 0.

As the transmission gate 67 is enabled by a logic 1 output signal from the AND gate 66 (i.e., at such time as the video level detector 5 determines that the video signal occurring in the target area is within the selected range), the video signal output from the transmission gate 61 is extended over the transmission gate 67 and conductor 5a to another position on the display selector switch 77.

Before discussing the signal output provided by the video detector 5 over conductors 5a and 5b to the display selector 6, it is noted that the quantized signal output on conductor 5b is also fed over conductor 5c to the target marker adapter 8.

TARGET MARKER ADAPTER 8

As indicated above, the purpose of the target marker adapter 8 is to provide a brightened outline of the target which has the spatial and brightness features selected. For this purpose, the quantized output of the AND gate 66 is coupled over conductor 5c to the switch 68 in the target marker adapter 8, the switch 68 being ganged to the switch S1 (FIG. 3) in the target selector and operated therewith (i.e., when the switch S1 is moved to the tracking position, the switch 68 will also close).

With the switch 68 closed, the quantized output of the video level detector 5 is transmitted to an active network comprising resistor 69 and a parallel resistor/capacitor network 70, 71 which is paralleled with a high gain operational amplifier 72. The active network 69, 70, 71, 72 provides a signal based on the quantized input from the video level detector 3 to the comparator 73 for comparison with a reference voltage to obtain an output signal which is indicative of the presence of a target in the target area selected by the operator having the brightness in the range selected by the operator as determined by the settings of the controls 62, 63 in the video level detector 5.

The output of the comparator 73 is connected as one input to an AND gate 75 which also receives a second input signal fed directly from the video level detector 5 through the switch 68. If a target with the selected spatial and brightness features is present, the signal output of the comparator 73 in the target marker adapter 8 will cause the AND gate 75 to gate the quantized output of the video level detector 5 to the OR gate 76 and over conductor 8b to the AND gates 51, 52. The gating of the AND gates 51, 52 by the signals on conductor 8b which occur during the period that the target is detected will, of course, result in the presentation of the target contour on the display. Further, since the gates 51, 52 will operate only when the targets in the selected area are being traced, the presence of other targets in other areas of the field will not result in improper operation of the system. The output of the AND gate 75 is also fed to the tracking computer 13 for the purpose of controlling the camera to be adjusted to a position which results in presentation of the selected target area in the center of the display as will be more fully described hereinafter.

In the absence of the target with the selected spatial and brightness feature for a predetermined length of time (which time is determined by the value of the resistor 70 and the capacitor 71) the comparator 73 will not enable the AND gate 75 and the output of the video level detector 5 will accordingly not be transmitted over the described paths to the target selector 3 and the tracking computer 13. However, in such event, the 0 logic output of the comparator 73 is inverted by the inverter 74 and fed over the OR gate 76 to the target selector 3 to enable the AND gates 51 and 52 in the target selector 3 so that the pulses representing the selected horizontal and vertical gating signals that determine the selected target area will be gated through the system.

DISPLAY SELECTOR 6

Figure 6:
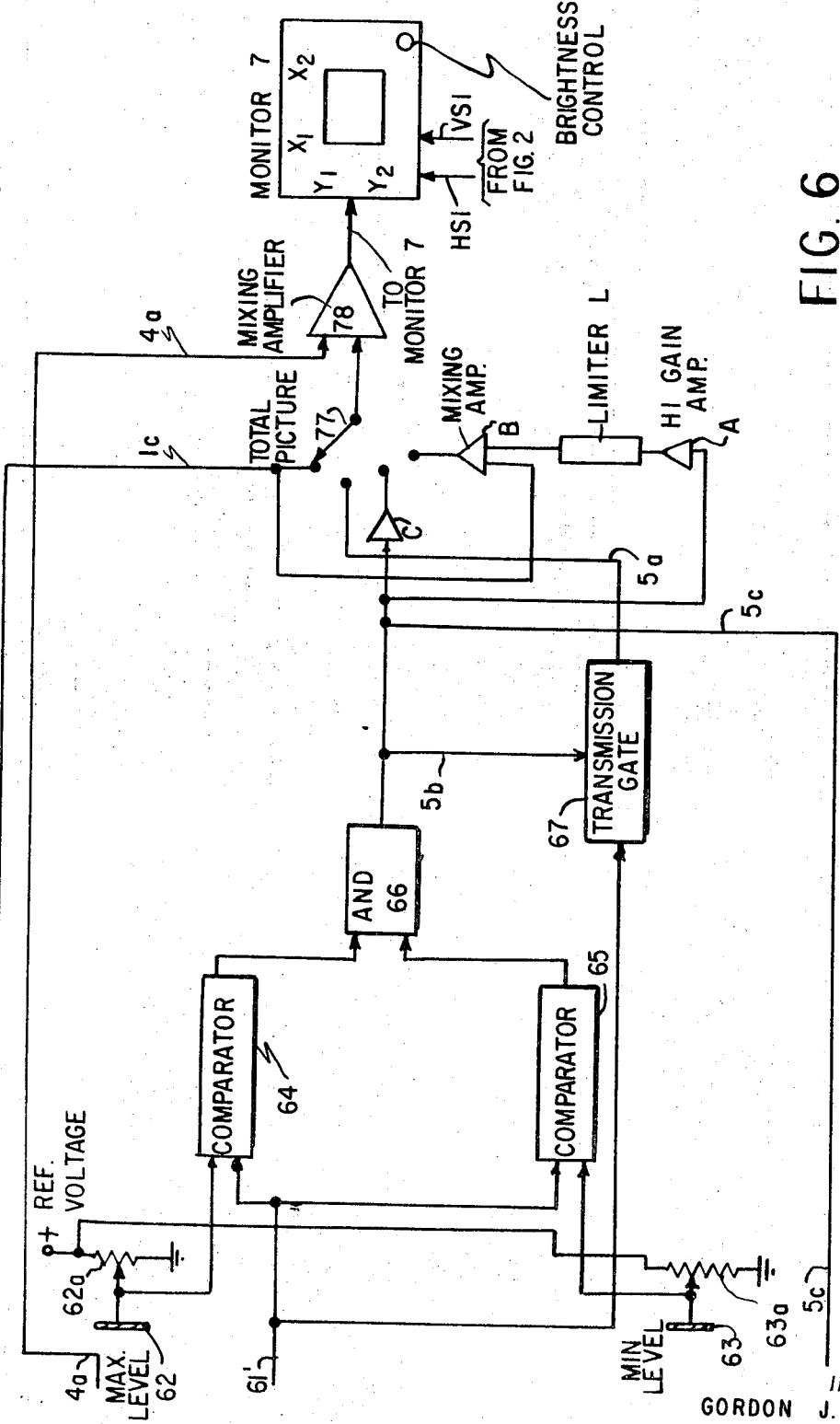

It will be recalled that the video level detector provides a plurality of signal outputs which were briefly described above. With reference to FIG. 6, it will be seen that the display selector 6 consists of a conventional multiposition switch 77 which is connected to couple different signal sets through the mixing amplifier 78 to the electron beam gun of the monitor 7. The different positions of the switch 77 are connected to (a) the video signal output from the electronic camera C in pictorial sensor means 1 received over conductor 1c, whereby signals representing the entire field of view of the camera may be coupled to the monitor 7, (b) video signals from the video level detector 5 received over conductor 5a indicating the target only, (c) quantized signals received over conductor 5b and amplifier C from the video level detector 5, and (d) the output of a mixing amplifier B which mixes the total picture signal on conductor 1c with signals derived from the quantized target signal on conductor 5b as greatly amplified by a high gain amplifier A and limited by limiter L, the resultant signals as fed to the monitor 7 providing a target of maximum brightness in the otherwise normal picture on the display. A second input of the mixer amplifier 78 is selectively connected via the target marker display switch 4 to the signal output of the target selector 3.

Thus with switch 77 in its different positions, the operator may select a display on the monitor 7 of (a) the total picture provided by the electronic camera C, (b) the target only, (c) a quantized representation of the target, (d) the target in bright display in the total picture. If the switch 4 (FIG. 4) in the target selector 3 is closed, the monitor 7 will also display the target markers outlining the target with the selected spatial and brightness features.

TRACKING COMPUTER 13

A second output of the target marker adapter 8 is fed over conductor 8a to one input of the tracking computer 13 which is also fed by the horizontal scan and vertical scan signals on conductors HS3, VS3. The primary function of the tracking computer 13 is to derive appropriate error signals from the video signal which is extended over conductor 8a by the target marker adapter 8. It will be recalled that a video signal is present on such conductor only if there is a significant target in the selected field (that is, a target which has a brightness within the range selected by the video level detector 5) and only while that target is being scanned. The tracking computer 13 determines the displacement of the center of the selected target area from the center of the monitor presentation, and generates output error signals for controlling the azimuth rate servo 14 and the elevation rate servo 15 to adjust the electronic camera so that the selected target will move to the center of the monitor display.

In the embodiment set forth in FIG. 2, the computation of the error signal is effected by computing the first moment of the selected target about a vertical axis through the center of the screen of the monitor 7, and dividing this first moment by the total area of the selected target to obtain the means value of horizontal displacement of the selected target from the center of the display on the monitor 7. The first moment of the selected target about a horizontal axis through the center of the screen of the monitor 7 is computed, and this first moment is divided by the total area of the selected target to obtain the mean value of the vertical displacement of the selected target from the center of the display on the monitor 7.

The total area of the selected target is computed in said embodiment by the use of an integrator 79 which has a first input for receiving the target indicating video signal from the video level detector 5 and the target marker adapter 8 over conductor 8a, and a second and third input which are connected to a clock 86 which is operative to provide an impulse at the end of the first field and a second impulse at the end of the second field of each frame (i.e., complete scan of the field of view). Said first impulse operates to reset the integrator 79 to zero and place it in the "hold" mode, and said second impulse operates to place the integrator in the "operate" mode.

The first moment of the selected target about the vertical axis through the center of the monitor screen (hereinafter referred to as the vertical reference axis) is computed by gating in the transmission gate 82 by means of the quantized output of the video level detector 5 (received over conductor 8a and applied to one input of the transmission gate 82), the horizontal displacement from the vertical reference axis of the point selected at any instant by the signal input over conductor HS3 from the horizontal scan drive 10 and integrating the resulting signal. The output of the transmission gate 82 is fed to the integrator 84 which integrates its input over the first field of each frame, the clock 86 being operative to provide pulses to reset the integrator 84 to zero and place it in the "hold" mode at the end of the first field of each frame and to place the integrator 84 in the "operate" mode at the end of each complete frame in sychronism with the integrator 79.

The first moment of the selected target about the horizontal axis through the center of the screen of the monitor 7 (hereinafter referred to as "horizontal reference axis") is similarly computed by the integrator 45 and the transmission gate 83 which has a first input connected to conductor 8a (which carries the quantized video output signal from the video level detector 5) and a second input connected to the vertical scan drive 11 over conductor VS3. The integrator 85 is reset to zero, placed in the "hold" mode, and placed in the "operate" mode in synchronism with the integrators 79 and 84 by the clock 86.

The first moment of the selected target about the vertical reference axis is divided by the total area of the selected target in the divider 87, and the first moment of the selected target about the horizontal reference axis is divided by the total area of the target in a second divider 88. An example of a divider circuit may be found in Electronic Instruments, First Edition, Fifth Impression, Ivan A. Greenwood, Jr., J. Vance Holdam, Jr., and Duncan Macrae, Jr. (Editors) McGraw-Hill Book company, Inc., New York, 1948, pp. 50—53. The dividers 87, 88 are connected to the output of the integrator 79 via a network comprising resistors 80, 81 and diode 99 which is tied to a reference voltage. The network 80, 81, 99 functions so as to provide an output which is basically determined by the reference voltage when the output of the integrator 79 is very small in magnitude, and to provide an output proportional to the output of the integrator 79 for magnitudes which are larger than a predetermined value. Such arrangement is effective against division by zero in the dividers 87, 88.

The mean value of displacement of the selected target from the vertical reference axis which appears at the output of the divider 87 is sampled and held in a sample-and-hold unit 89 just prior to the time at which the integrators 79, 84 and 85 are reset to zero. The mean value of the selected target about the horizontal reference axis is similarly sampled and held in a second sample-and-hold unit 90 just prior to the time at which the integrators 79, 84, 85 are reset to zero. The sample-and-hold unit may be any known device that provides an output between successive sampling instants that is equal to its input at the most recent sampling instant. An example of such a device may be found in Notes on Analog-Digital Conversion Techniques, Alfred K. Susskind (Ed.), John Wiley and Sons, Inc., New York, 1957, pp. 5—62 and 5—63.

The sample-and-hold circuits 89 and 90 are connected to the clock 86, which is operative to provide a sampling pulse just before the integrators 79, 84, and 85 are reset to zero at the end of the first field of each frame.

The azimuth error voltage which is the output of the sample-and-hold circuit 89 is transmitted over the scan switch 100 (assuming the scan switch is in the "off" position) and the mixing amplifier 97 to the azimuth rate servo 14. The elevation error signal which is the signal output of the sample-and-hold unit 90 is transmitted directly through the scan switch 101 (assuming the scan switch in the "off" position) and a second mixing amplifier 98 to the elevation rate servo 15.

The azimuth rate servo 14 alters the azimuth position of the electronic camera at a rate approximately proportional to the azimuth error signal provided by the tracking computer 13 and in a direction as to tend to reduce the error signal to zero. In a similar manner the elevation rate servo 15 alters the elevation attitude of the electronic camera at a rate approximately proportional to the elevation error signal provided by the tracking computer 13 and in a direction as to tend to reduce the error to zero. The rate servos 14, 15 may be any known automatic control system with mechanical rotation having an output characterized by the property that the rate of change of output is approximately proportional to the magnitude of its input, and the sign of the rate of change of the output is in one-to-one correspondence with the sign of the input.

The tracking computer 13 further includes switching means 91, 100 and 92, 101 which permit the operator to adjust the camera scan both in azimuth and in elevation. When the scan switches 91 and 100 are in the right or R position, the signal output from the computer 13 is interrupted by switch 100, and direct ground is substituted in lieu thereof to one input for mixer amplifier 97. Switch 91 in such position connects a positive reference voltage to one end of voltage divider 93. A portion of the voltage drop across voltage divider 93 is transmitted through a spring return toggle switch 95 and mixing amplifier 97 to azimuth rate servo 14. The spring return toggle switch is operative between a high and a low position to vary the amount of voltage transmitted to the mixing amplifier 97, and thereby permit selection of a high or low speed of servo change by the operator. With the scan switch in the R position the camera will move to the right at a speed determined by the setting of switch 95 (i.e., high or low). In a similar manner, by movement of the scan switches 91 and 100 to the L position and a corresponding operation of the spring return toggle switch 95, a negative scan voltage of small or large amplitude can be transmitted to the azimuth rate servo 14 to effect fast or slow movement of the camera to the left.

A corresponding pair of scan switches 92 and 101 are provided for effecting adjustment of the camera about its elevation axis (i.e., upward or downward), and a second spring return toggle switch permits such adjustment at a fast or a reduced speed, such switches being connected in the manner of switches 91, 100 to provide a related output to the mixing amplifier 98 and the elevation rate servo 15. The mode of operation will be obvious by reference to the legends U, D, adjacent the switches 92, 101 which identify movement of the camera upward and downward, respectively.

An interlock (not shown) is connected between the scan switches 91, 92, 100 and 101 and the track switches 22 and 38 in the target adapter marker 8. That is, it is desirable to permit the operator to actuate the scan switches freely when the track switch S1 (22 and 38, FIG. 3) in the target selector 3 and the switch 68 in the target marker adapter 8 are in the "off" position, but to open the track switch S1 and the switch 68 automatically (if they are in the on position) when either scan switches 91 and 100 or scan switches 92 and 101 are moved from the "off" position to the "on" position.

A second function of the interlock is to enable the operator to actuate the track switch S1 (22, 38) in the target selector 3 and the track switch 68 in the target marker adapter 8 freely when the scan switches 91, 100, 92 and 101 are in the "off" position, but to return the scan switches 91, 100, 92, 101 to the "off" position automatically (if they are not in that position) when the track switches 22, 38, 68, are placed in the "on" position. Thus the interlock serves to prevent improper operation of the azimuth rate servo and the elevation rate servo.

The azimuth transducer 16 and the elevation transducer 17 in conjunction with the target direction indicator 18 measure and display the azimuth position and elevation position of the electronic camera at all times in a manner well known in the art.

OPERATION

In a typical situation, the equipment might be operated in the following manner: Initially, the attendant views the scene presented on the monitor with the track switch in the "off" position, the scan switches in the "off" positions, the horizontal and vertical target coordinate selectors adjusted to encompass the total scene displayed on the monitor, the minimum-brightness selector at its lowest setting, the maximum-brightness selector at its highest setting, the display selector in its second position (target only), and the marker display switch in the "on" position. If the attendant sees a target of interest in the scene displayed on the monitor (which is the total scene viewed by the electronic camera), he adjusts the maximum-brightness selector and the minimum-brightness selector so that the selected target is just within the selected brightness range. (That is, the adjustments are made so that an increase in the setting of the minimum-brightness selector or a decrease in the setting of the maximum-brightness selector would result in the vanishing of all or a part of the selected target from the scene displayed on the monitor.) The attendant then adjusts the horizontal-coordinate selectors and the vertical-coordinate selectors so that the selected target is just contained within a bright rectangle on the monitor screen. (The monitor screen will now be blank outside the illuminated rectangle, but there may be one or more spurious illuminated areas within the rectangle, in addition to the target of interest.) At this time the attendant actuates the track switch to the "on" position whereupon the rectangular marker adapts to conform to the boundary of the selected target and the selected target, so outlined, is automatically brought to the center of the display on the monitor and kept there by the system. The attendant may then utilize the display selector switch to display the quantized target or the total picture obtainable from the electronic camera, or the total picture with the target brightened to maximum intensity. He may also return the marker display switch to the "off" position, if he does not wish to have the target outline brightened.

If no target of interest appears in the scene initially displayed on the monitor, the attendant actuates one or both of the scan switches (and possibly one or both of the spring-return toggle switches) to alter the field of view and search for a target of interest. When such a target appears on the monitor screen, the attendant returns the scan switches to their "off" positions and proceeds as described previously for the case in which a target of interest appears initially.

While only particular embodiments of the invention have been described and illustrated, it is apparent that modifications and alterations may be made therein. Accordingly, it is the object of the invention in the appended claims to cover all such modifications and alterations as may fall within the true spirit and scope of the invention.

I claim:

1. In a pictorial tracking and recognition system having display means, electronic sensor means for providing information signals representative of detected information in a field for presentation on said display means, target selector means connected to said electronic sensor means for providing signals which define a target area in said field, video level detector means including brightness selector means for selecting a brightness range for a significant target within said target area having minimum and maximum values, and brightness detector means connected to said target selector means and said brightness selector means to gate to said display means only those information signals which have a brightness in the range selected by said brightness selector means and which occur in said target area selected by said target selector means.

2. A system as set forth in claim 1 in which said brightness detector means in said video level detector means includes output means for providing a quantized signal output to said display means which represents said target.

3. A system as set forth in claim 1 in which said brightness detector means includes gate means for extending information signals generated by said sensor means to said display means, and comparator means connected to said target selector means and said brightness selector means for enabling said gate means only when a significant target represented by signals within said selected range is detected.

4. A system as set forth in claim 3 which includes means connected to said target selector means for extending only information signals from said sensor means to said brightness detector means which are within said target area.

5. A system as set forth in claim 1 in which said brightness selector means in said video level detector includes a first means for selecting a maximum signal level for the selected target, and a second means for selecting a minimum signal level for the selected target, and in which said brightness detector means includes comparator means connected to said target selector means and said first and second means for providing an output signal only when the level of said information signals provided by said sensor means is within the range of levels selected by said first and second means.

6. A system as set forth in claim 1 in which said target selector means includes means for gating to said video level detector means only the ones of said information signals which represent information in said target area.

7. A system as set forth in claim 1 which includes marker means in said target selector means for providing signals to said display means which outline the selected target area on said display means.

8. A system as set forth in claim 1 in which said target selector means includes marker means for providing signals which outline a selected target area on said display means, and which includes target marker adapter means having input means connected to the output of said video level detector means, and output means connected to control said marker means to provide signals which outline the selected significant target on said display means.

9. A system as set forth in claim 1 which includes tracking computer means connected to said sensor means to continually adjust the field of said sensor means to maintain the target selected by said target selector means in the field of said sensor means.

10. A system as set forth in claim 1 in which said target selector means has target-gating means for controlling gating of said target area signals to said video level detector means, and which includes target marker adapter means comprising input means connected to the signal output of said brightness detector means, comparator means for comparing said signal output with a reference signal to determine the presence of a target of a selected brightness feature, means controlled by said comparator means whenever a target is detected to control transmission of said signals to said target-gating means, and means controlled by said comparator means in the absence of said target to control transmission of an enabling signal to said target-gating means.

11. In a pictorial tracking and recognition system having display means including means for generating a raster on said display means, sensor means for providing information signals representative of detected information in a field for presentation on said display means, target selector means connected to said sensor means for providing signals which define a target area in said field comprising first reference means for selecting the X coordinates of said target area on said display means including a first selector means for selecting the first X coordinate of each line in the target area, and a second selector means for selecting the last X coordinate of each line in the target area, and first generator means connected to said first and second selector means for providing an X coordinate signal output in each raster line only during the period of raster line trace between the selected X coordinates, a second reference means for selecting the vertical coordinates of said target area including a third selector means for selecting the Y coordinate for the first raster line of the target area and a fourth selector means for selecting the Y coordinate for the last raster line of the target area, and second generator means connected to said third and fourth selector means for providing a Y coordinate signal output only during the period of trace of the raster lines between the lines having the selected Y coordinates, and target gating means connected to said first and second generator means for providing signals to said display means only during the time period in said raster trace of concurrent signal output from said first and second generator means.

12. A system as set forth in claim 11 in which said target-gating means includes differentiating means for differentiating the leading and trailing edge of the signals from said first and second generator means.

13. A system as set forth in claim 11 which includes means connected to the output of said first and second generator means including target marker adapter means operative to provide signals to the input for said target-gating means to control same to provide a display of the outline of the target.

14. A system as set forth in claim 11 which includes a video level detector connected to the output of said target-gating means for detecting significant targets in a predetermined brightness range in said target area, and means in said target-gating means for transmitting information signals from said sensor means to said video level detector means only during the period of concurrent signal output of said first and second generator means.

15. A system as set forth in claim 11 in which said first selector means comprise voltage means for providing an upper level voltage and said second selector means comprises voltage means for providing a lower level voltage for selecting the horizontal coordinates of the target area, and said first generator means includes means connected to the output of said first and second selector means for computing the average value of said upper level and lower level voltages, a first means for subtracting said average value voltage from said upper level voltage to provide a modified upper level voltage, and a second means for subtracting said average value from said lower level voltage to provide a modified lower level voltage, comparator means for comparing the modified lower level voltage with the modified upper level voltage, mixer means, and a first and second transmission gate controlled by the output of comparator means to selectively gate the modified lower or upper level voltage to said mixer means, a first comparator means for comparing the output of said mixer means with the horizontal scan signals for said display means, and a second comparator means for comparing the output of said second means with said horizontal scan signals, and means controlled by said comparator means to provide a gating signal output for the period of raster trace of the X coordinates selected by said first reference means.

16. In a pictorial tracking and recognition system having display means, electronic sensor means for providing signals representative of information detected in a given field, target selector means connected to said electronic sensor means for providing signals defining a selected target area in said field, video level detector means connected to said target selector means for selecting a significant target of an established brightness within said target area having a minimum and a maximum brightness value including means for providing output signals in response to detection of said significant target in said field, tracking means including actuator means connected to said sensor means for continually positioning said sensor means to maintain said target in its field of sensing, and means connected to said video level detector for connecting signals to said tracking means for use in controlling the operation of said actuators and positioning of said sensor means.

17. A system as set forth in claim 16 in which said tracking means includes means for detecting the X, Y distances of a reference point for said selected target from a predetermined reference point on the display means, and means for providing error signals related to said distances to said actuator means.

18. A system as set forth in claim 16 in which said tracking means includes means for providing signals indicating the total area of the selected target, first means for computing the first moment of the selected target about a vertical axis through the center of the display, means for dividing said first moment by said total area to obtain a signal indicating the mean value of horizontal displacement of the selected target from the display center, means for computing the first vertical moment of the selected target about a horizontal axis through the display center, and means for dividing said first moment by the total area of the selected target to obtain the mean value of the vertical displacement of the selected target from the display center, and means for coupling the resultant signals to said actuator means.

19. A system as set forth in claim 18 in which said last means includes sample and hold circuits for providing an output to said actuator means between successive sampling instants which are equal to its input at the most recent sampling instant.

20. A system as set forth in claim 16 which includes switch means for enabling the operator to disable said tracking means, and to effect scanning movement of the sensor means independent of the output of said tracking means.

21. A system as set forth in claim 16 in which said actuator means comprises a first actuator for altering the azimuth alignment of said sensor means at a rate approximately proportional to the mean value of the calculated horizontal displacement, and a second actuator for altering the elevational alignment of said sensor means at a rate approximately proportional to the mean value of the calculated vertical displacement.

22. In a pictorial tracking and recognition system having display means, electronic sensor means for providing information signals representative of detected targets in a field for presentation on said display means, first means including selector means for establishing predetermined identifiable characteristics for a target in said field, second means for selectively gating information signals from said sensor means to said first means, third means in said first means connected to said selector means and said second means operative to provide output signals to said display means only in response to receipt of information signals provided by said sensor means which have the predetermined identifiable characteristics selected by said selector means, and fourth means including target marker adapter means connected to the output of said third means operative to provide signals which trace the contour of the target on said display means.

23. A system as set forth in claim 22 in which said first means includes brightness selector means for establishing a predetermined brightness for the selected target, and in which said third means includes comparator means connected to said selector means and said second means for providing output signals to said display means only when the information signals for a target are of said predetermined brightness.

24. A system as set forth in claim 23 in which said third means includes output means for providing a quantized signal to said target marker adapter means, and in which said fourth means include means for modifying said quantized signals to provide display of the target contour on said display means.

25. In a pictorial tracking and recognition system having display means, electronic sensor means for providing information signals representative of detected information in a field for presentation on said display means, target selector means connected to said electronic sensor means for providing signals which display a target area in said field, video level detector means including brightness selector means for selecting a predetermined brightness for a significant target within said target area, and brightness detector means connected to said target selector means said brightness selector means to gate to said display means only those information signals provided by said sensor means which are in the target field selected by said target selector means and which have a brightness selected by said selector means, and target adapter means responsive to the output signals of said brightness detector means for controlling said target selector means to provide a display of the contour of said target on said display means in lieu of said target area display.